455-603 AU 233 EX

FIP8106 OR 3,294,901

EXAMINER

23

Apr. 6, 1962 F.P. date

Dec. 27, 1966 C. STANGHI 3,294,901

270,436

DEVICE FOR REMOTE CONTROLLING OF RADIO AND TELEVISION RECEIVERS

Filed April 3, 1963 2 Sheets-Sheet 1

I 4-6-62

See art cited

INVENTOR
Cino Stanghi

BY Michael S. Striker
ATTORNEY

F 1354463

Dec. 27, 1966 C. STANGHI 3,294,901

DEVICE FOR REMOTE CONTROLLING OF RADIO AND TELEVISION RECEIVERS

Filed April 3, 1963 2 Sheets-Sheet 2

INVENTOR.
Cino Stanghi
BY Michael S. Striker
ATTORNEY

United States Patent Office 3,294,901
Patented Dec. 27, 1966

3,294,901

DEVICE FOR REMOTE CONTROLLING OF RADIO AND TELEVISION RECEIVERS

Cino Stanghi, 21 Via Dario Papa, Milan, Italy

Filed Apr. 3, 1963, Ser. No. 270,436
Claims priority, application Italy, Apr. 6, 1962, 6,919/62
1 Claim. (Cl. 178—6)

This invention generally relates to remote control of radio and television receivers and is particularly concerned with a new and advantageous method or system for controlling one or more conditions of operation of a television receiver, from a location spaced from the receiving apparatus. It further relates to device for remote controlling of a radio and particularly but not exclusively a television receiver, according to said new method or system.

It is known that means and devices designed for remote controlling of a radio and particularly a television receiver are desirable and in demand. By remote controlling of a radio or television receiver there is hereby meant any action which might modify the operation of the receiver, such as to switch on or off the same, or to the switch the same from one to other broadcast channel, or to vary any audio or video condition of the receiver, such action being exerted without material contact with the receiver's knobs or other manual control means of the receiver, and particularly exerted by a person who enjoys the broadcasting while being located comfortably seated at a substantial space from the receiver. Such remote controlling is further intended to be performed without material connection, such as provided by electrical conductors for example, between the receiver and the location wherein the action for remote controlling is performed.

It is further known that several systems and means had been heretofore proposed for providing such remote controlling of said receiving sets. It had been proposed, for example, to use ultra-audible vibrations and radio frequencies, emitted by a suitable vibrations or frequencies generator, as a vehicle for transmitting at command the controlling action to an adapted receiver associated with the television receiving set, the generator being designed to be placed adjacent to the viewer.

The devices heretofore proposed and on sale, which operate according to the above known systems, are very expensive and subject to several objections, such as the requirement of very careful adjustment and tuning which may be performed by very skilled personnel only, and the disturbance thereof by external sources of vibrations or of frequencies.

It is therefore a primary purpose of this invention to provide a new and advantageous method and means which are not subject to the above and other objections and which may be embodied in relatively not expensive devices ensuring proper and regular operation.

A further object and purpose of this invention is to provide a new method for remote controlling of a radio or television receiver which is not substantially influenced by ambient factors. A still further object is to provide new devices responsive to remotely generated control action and which are constructed either as a component of or structurally associated with the receiver to be controlled, or as an unit adapted to be electrically connected to said receiver, such as at any desired location of the feeding conductors thereof for remotely controlling the switching on and off said receiver.

Another object of this invention is to provide a new method as above, which might permit selective remote control of a number of modifications of condition of operation of a receiving set of the type above considered. A specific object of the invention is to provide new and improved remote control responsive devices embodying a new and advantageous combination of features including a remotely emitted signal responsive component, switch means connected to a circuit of or connected to the receiving set for modifying the operation thereof, and actuator electronic means responsive to said component and actuating said switch means in response to said emitted signal. Other purposes, objects and advantages of the invention will become apparent from the ensuing description.

Having the above and other objects and considerations in mind, the invention provides a method for remote controlling of a radio and particularly a television receiving apparatus, that comprises emitting at command and by a manually controlled generator a beam of light radiations having frequencies comprised in the range of wave lengths from 3,000 to 12,000 Angstroms, directing such beam on a radiation sensing element adapted to emit an electric signal consisting of an electrical variation upon impingement of such light radiation thereon, a bi-stable relay having a coil connected to said element and responsive to said electrical variation, a movable contact responsive to energization of said coil and fixed contacts, and terminals connected to said contacts and to a circuitry influencing the operation of said apparatus.

Other objects and advantages of the invention are in part obvious and in part will be made apparent as this description proceeds, and the novel features of this invention are set forth in the appended claims. The present invention however, both as to its construction and operation, will be best understood by way of illustration and example by the following detailed description of preferred forms of embodiments thereof, when taken in conjunction with the accompanying drawings, forming an essential component of this disclosure, and wherein:

Referring now to the drawings, wherein like reference numerals refer to like or equivalent parts or elements throughout the several figures.

Figure 1:
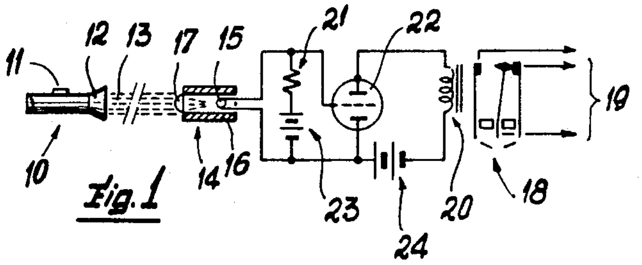
FIGURE 1 is a schematic representation of a basic embodiment of the invention.

As to its broader aspect shown in FIG. 1, the invention includes a generator of a beam of light radiation, generally indicated at 10. Such generator might consist of a conventional flashlight or hand lamp provided with a manually operatable switch 11 and of a suitable reflector 12 adapted to convey a beam 13 of light radiation produced by a suitable source of radiations, of wave length comprised between 3,000 and 12,000 Angstroms, such source forming a component of said generator. Such source is preferably adapted for emitting a light beam including visible light radiation, for facilitating the aiming of the beam on the radiation sensitive element of the device.

It is further preferred, as it will be made apparent as this description proceeds, that such source of radiation is adapted to emit light radiations prevailingly including radiations of lower frequencies in the above stated range of wave lengths, such as a remarkable amount of radiations in the order of red. Conventionally constructed incandescent lamps meet the above conditions and therefore might be used for the purpose of the invention, however, it will be apparent that such source of radiations might be differingly provided to meet said requirement.

The radiation beam generator will not be further described in detail, as such generator as individually considered may be provided by applying current knowledge of the art, provided that the above and other following requirements would be met. In addition the said radiation beam will be intended, herein below and in the meaning of the appended claims, as including light radiations of the above stated character.

The device includes further a light radiation sensing and responsive component, generally indicated at 14, including at least a photoelectric element 15 adapted to cause an electrical variation in a depending circuit when light excited. Such photoelectric element 15 may consist of a photoelectric cell and the resulting electrical variation will be therefore a current generation therefrom, or preferably a photoresistor, and the resulting electric variation will therefore consist of a potential variation caused in a circuitry by a variation of resistivity of said photoresistor connected in said circuitry.

The photoelectric element is preferably supported by and located within a casing 16, preferably of material impervious to light and provided with an opening for passage of a light beam. In addition, light radiation converging or focusing means generally indicated at 17 are provided, which may concentrate the radiation on the sensitive part of said element 15. Such converging or focusing means may consist of a suitable reflector and/or of one or more lenses; said components may be located on the front wall or panel of a television receiver or in any differing location where the beam 13 may be aimed at. In addition, reflecting means such as a flat or focusing mirror, might be used for directing said beam onto the said sensing and responsive component.

According to an important feature of the invention, means adapted for preventing the said photosensitive element to be excited, at least to the extent required for causing the operation of the device, by regular ambient illumination, such as diffuse illumination in a room wherein a television receiver is on, may be provided, upon proper selection of the light radiation frequencies, and/or by making use of a polarized light beam, for example.

Preferably, such means includes the provision of color screen means, such as an optical filter impervious to frequencies higher than frequency of yellow light, on the path of such beam 13. Said latter means might be individually formed and located at the opening of casing 16, for example, and/or combined or integrally formed with said focusing means, or also integrally formed with the photoelectric element 15. By making use of a generator 10 including a source of light radiation prevailingly including light energy of frequencies appertaining to the lower values in the above stated range, the said photoelectric element will be properly excited by beam 13, while regular ambient illumination will not be effective with respect to operation of the device.

The electrical variation caused by said photoelectric element 15 upon excitation thereof by a commanded beam 13, is applied for operating a snap-over switch means such as diagrammatically indicated at 18 and of known construction, such as at any action performed by the viewer by operating generator 10 the said switch 18 may be operated upon energization of its coil 20. According to current art, such switch 18 includes movable and fixed contacts having terminals which are assumed to be connected, as diagrammatically indicated at 19, to the circuitry of a television receiver desired to be remotely controlled.

FIG. 1 illustrates further an advantageous mode of making said switch 18, 20 responsive to electrical variations from a photoresistor embodying the photoelectric element 15. Such photoresistor is connected in the device's circuit to form, jointly with a resistor 21, a potential divider applied to the grid of a triode 22 whose anode voltage supply includes a battery 24, while another battery 23 applies a negative potential to said grid, with respect to the cathode thereof.

The electrical characteristics of said components are so chosen that if said beam 13 is not activated or directed to excite the photoresistor at 15 which might be of cadmium type and such that its resistivity decreases upon light excitation, the negative potential applied to the grid of triode 22 will prevent the anode voltage to flow across coil 20 of the switch, at least at the extent required for operating said switch. Inversely, as said photoresistor at 15 is excited by beam 13, upon proper performance of the remote control action, the ratio of the potential divider embodied by said photoresistor and resistor 21, decreases, and therefore the negative polarizing potential of grid of triode 22 is decreased too and the switch 16 is therefore activated.

Figure 2:
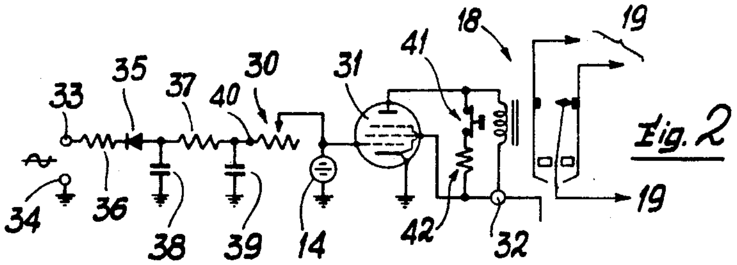
FIGURE 2 is a modification of the signal responsive assembly of the device, including feeding components provided for feeding such assembly by the circuitry appertaining to the remotely controlled apparatus.

A device constructed as shown in FIG. 1 requires two batteries such as at 23 and 24 for operation. FIG. 2 shows an improved embodiment of said device, wherein means are provided for supplying same by current derived by the circuits of an actual television receiver. Such improved component is assumed to include a photoresistor as its photoelectric element of the radiation beam sensing and responsive component diagrammatically indicated at 14 and a relay at 18 connected at 19 to the circuitry of the television receiver (not shown) to be remote controlled according to the invention. The device hereinbelow described is actually produced and widely applied to a commercial television receiver type "Comet" manufactured and sold by "Ultravox S.r.l." of Milan (Italy), for switching said receiver from VHF to UHF operation, and vice versa, upon remote control.

In the device of FIG. 2, the potential divider includes a variable resistor at 30, in series connection with the control grid of a tube 31, whose anode voltage is used for operating said relay 18. It is assumed that point 32 is connected to the positive pole of filtered anode voltage of the anode supply of the television apparatus (not shown) to which the device is coupled for operation. Terminals 33 and 34 are assumed to be connected to an A.C. source, such as about 70 v., taken from a suitable position along the series of the filaments of the television receiver, for example. Terminal 34 is connected to the receiver's ground. Diode 35, together with resistors 36 and 37 and condensers 38 and 39, is used for supplying D.C. to terminals of said condenser 39.

Owing to the location as shown of diode 35 with respect to other components, the potential at condenser 39, relatively to ground, is negative and as required for operation of the potential divider, including components 14 and 30, with respect to control grid of tube 31.

Where a proper supply of negative potential may be had from the television receiver's circuitry, with respect to ground, components 35 to 39 inclusive might be omitted, as it is possible to connect such supply to terminal 40 of potentiometer 30. Such resistor has been provided of variable type, i.e., as a potentiometer, for adjustment purpose, particularly in view of adjusting the negative potential applied to grid of tube 31 at the most convenient value either for proper adjustment of the device to responsively sensing the remote control beam on its photoelectric component, and for tuning of the device according to the unpredictable characteristics of its photoelectric and tube components.

The device of FIG. 2 is further provided with manually operated switch means such as a push button at 41 for activating relay 18 when remote control is not possible or desired. A resistor 42 is provided for adjusting the applied potential in view of proper response of relay 18.

As a specific embodiment of an actually produced and operated device such as shown in FIG. 2, controlled by a photoresistor type ORP. 60, components as listed below may be used, such components being indicated by their reference numerals of said FIG. 2:

| Component: | Character and type |
|---|---|
| (18) | Bi-stable relay coiled for 1,000 ohms. |
| (30) | 20M-ohms potentiometer. |
| (31) | EF. 184 tube. |
| (35) | OA. 81 diode. |
| (36) | 1K-ohms .5 watt resistor. |
| (37) | 1M-ohms .5 watt resistor. |
| (38) | .01 $\mu$f. 200 V1. condenser. |
| (39) | 1 $\mu$f. 200 V1. condenser. |
| (42) | 3,500 ohms 10 watts resistor. |

It will be however apparent to those skilled in the art to which this invention appertains that the photoelectric element of the devices of the invention might consist of a photoelectric cell also, as above stated. In such a case, and referring back to FIG. 1, the said element indicated at 15 might be a photocell, and the grid of triode 22 will be polarized so that the anode voltage thereof shall be prevented to pass, at least to the extent required for activation of relay 18, when said photocell is not excited by beam 13. The said photocell thus located at 15 will obviously be selected so that it might generate a potential capable of substantially zeroing the negative potential at said grid, upon excitation by a viewer activated and remotely controlled beam 13.

Figure 3:
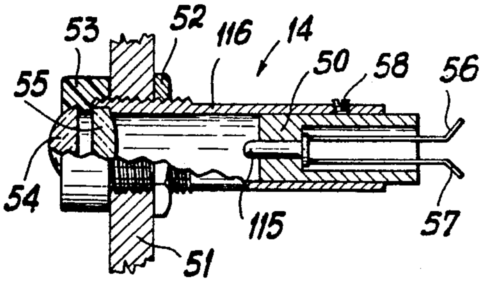
FIGURE 3 illustrates, in longitudinal section and partly in side elevation, of a radiation sensing element supporting structure.

FIG. 3 shows an example of arrangement of a photoelectric element such as shown at 115 in a proper structure, such element 115 being the photoresistor as above described with relation to operation of the device of FIG. 2, for example. Said element is axially seated within a support member 50 slidably fitted inside a tubular member 116 impervious to light and having a fore opening. Such member 116 may be secured to a stationary structure, fragmentarily indicated at 51, such as the front panel of a television receiver, for example, by means of a screw-threaded ring nut 52, for example, co-operating with an outer shaped ring 53 threaded to the outer end portion of said member 116 and wherein a lens 54 is secured. Such ring 54 locks a second inner lens 55 at the said fore opening of member 116. Said lenses 54 and 55 jointly actuate a focusing optical system by which the command radiation beam directed on lens 54 is caused to converge on the photo-sensitive head portion of element 115.

Said photo-sensitive portion may be adjusted in the focus of said optical system upon axial displacement of member 50 in member 116, a pressure screw 58 being provided for securing said latter member upon adjustment thereof, for example. The proper adjustment of said photo-sensing portion in the focus of a suitable focusing system, such as embodied by lenses 53 and 54, for example, may be checked by connecting an ohmmeter (not shown) to terminals 56 and 57 of the photoelectric component such as at 115, and the said adjustment is reached, upon proper illumination of said portion, in the conditions of service of the device, when the reading of ohmmeter is lowest.

The described photoelectric component supporting structure is further advantageously provided with a color screen means, for the purpose stated hereinabove, to filter the command radiation for passage of lower frequencies such as of yellow light or lower. An orange or red transparent optical filter has been found suitable for the purpose of the invention, such filter being further not impervious to infra-red radiations, as emitted by a conventional incandescent lamp with which the generator 10 (FIG. 1) may be advantageously provided.

Such optical filter may be integrally formed in the same photoelectric element at 115, by coloring its head portion and/or its transparent body, for example, or formed by a colored transparent element seated at the fore opening of the member 116, for example. In addition, such optical filter may be embodied in one of the components of the focusing system, such as the outer lens 54, for example.

The structure shown in FIG. 3 had been advantageously produced by using an outer lens such as at 54 of red transparent glass and having a focal length of about 15 to 20 mm. and of an inner clear lens such as at 55 having a focal length of about 35 mm.

Figure 4:
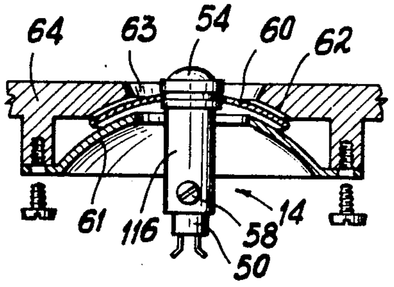
FIGURE 4 is a fragmentary view, partly in side elevation and partly in sectional elevation, of a structural assembly designed for adjustably supporting a structure such as shown in FIG. 3.

In consideration of the fact that the viewer who wishes to remotely control the television receiver may be accommodated at differing locations with respect to said receiver, the beam sensing element supporting assembly, such as generally indicated at 14 in the several figures, may be advantageously supported on a stationary structure, such as the front panel of the receiver, for example, by means designed for directional adjustment of such assembly. FIG. 4 illustrates a possible exemplificative form of such construction.

Assembly 14, of the type shown in FIG. 3, for example, is secured at the center of a spheroidal cap 60 frictionally engaged between an inner correspondingly shaped stationary member 61 and the inner edge 62 of an opening 63 provided in a stationary structure component 64, which may be secured to or integrally formed with the front panel of the television apparatus, for example. The above construction, as shown, may therefore allow ample directional adjustment of assembly 14 for alignment thereof with the command beam, generated by a generator such as at 10 (FIG. 1) located at various height and angular direction with respect to the beam responsive device, as desired by the viewer.

Figure 5:
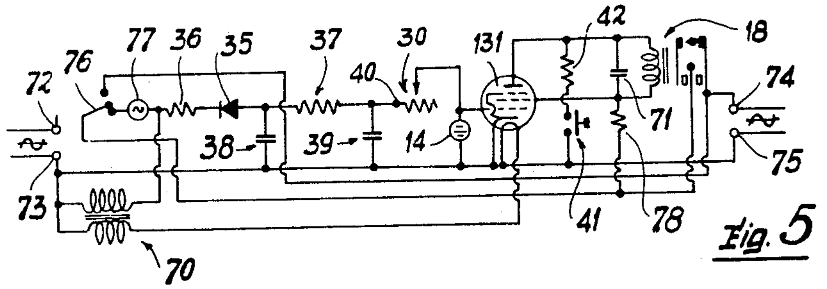
FIGURE 5 illustrates the signal responsive assembly of a device according to the invention, and adapted to be produced as an unit and to be connected along the feeding cable or conductor of a receiver such as a television receiver, for switching on and off the same, upon remote control.

Devices constructed as above described in conjunction with FIGS. 1 and 2 are prevailingly designed for structural combination thereof with a television apparatus, and to be connected to properly selected points of the circuitry thereof. FIG. 5 illustrates an embodiment of this invention, which is adapted to be constructed as an individual unit and advantageously connected across the feeding conductors or cable, at any desired location of said cable, for remotely controlling, according to the invention, switching on and off of a conventional television receiver or radio receiver.

The device illustrated in FIG. 5 includes a plurality of components operating and connected as shown in FIG. 2, and therefore such components are indicated by same reference numerals and will not be further described. In respect with the said above described device, the modification of FIG. 5 includes a tube 131 which is A.C. supplied, for obvious economy and simplicity purposes, by means of a transformer such as at 70. A condenser 71 stabilizes the bi-stable relay 18. The regular A.C. source at disposal is connected to input terminals 72 and 73 of the device, while at the output terminals 74 and 75 thereof the receiver set is connected, by means of its supply cable conductor for example.

By means of a commutator switch at 76 the remote control command sensing device may be by-passed, as desired. A protection fuse 77 is provided and a further condenser at 78 is provided with respect to the components of the device of FIG. 2. The modification of FIG. 5 may be advantageously constructed by using components of type and character as listed below, with reference to numerals of said FIG. 5:

| Component: | Character and type |
|---|---|
| (18) | Bi-stable relay coiled for 1K-ohms. |
| (30) | 20M-ohms potentiometer. |
| (35) | OA.81 diode. |
| (36) | 68K-ohms resistor. |
| (37) | 1M-ohms resistor. |
| (38) | 10 K-pf. condenser. |
| (39) | 1 $\mu$f. condenser. |
| (42) | 1.5K-ohms resistor. |
| (70) | 220 to 6.3 v. transformer (the input potential being obviously in relation with the A.C. supply at disposal). |
| (71) | 3 $\mu$f. condenser. |
| (78) | 300 ohms resistor. |
| (131) | EF. 184 tube. |

The device had been connected for response to electrical variation from a photoresistor as indicated in relation with above described constructions and arranged as described in FIG. 3, for example.

Figure 6:
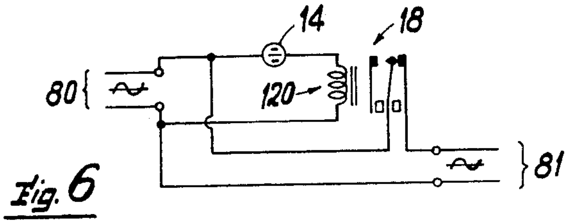
FIGURES 6 and 7 show further forms of embodiment of such assembly.

In the modification shown in FIG. 6 the relay at 18 is activated directly across the photoelectric element 14 including a photoresistor, and is used, for example, for switching on and off a television receiver, whose A.C. supply is connected at input 80 of the device, and whose supply or feeding conductors are connected at output terminals 81. The A.C. current supplied to the receiver is applied also to photoresistor at 14 and coil 120 of relay 18. Such embodiment of the invention is obviously provided with a photoresistor adapted to resist to the A.C. current adapted for activation of relay 18.

Figure 7:
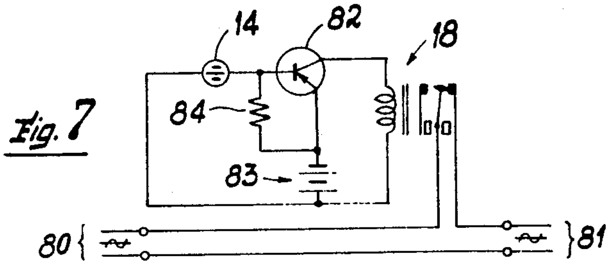

A further advantageous embodiment of the invention is shown in FIG. 7, wherein a device, which may be individually constructed or integrally arranged in a television receiver is shown for switching on and off the same upon remote control according to the invention, the device including input and output terminals at 80 and 81, respectively, for connection and operation similar to those described with reference to FIG. 6.

In the embodiment of FIG. 7, the relay 18 is made responsive to the electrical variation from photoelectric element at 14 by means of a transistor 82, supplied by a suitable source such as a battery 83, and its circuit includes a resistor 84 connected as shown. Such latter embodiment of the invention, sensing the controlled radiation beam such as at 13 in FIG. 1, by means of a photoresistor such as above specified, for example, may suitable include the components listed below:

| Component: | Character and type |
|---|---|
| (18) | bi-stable relay coiled for 250 ohms. |
| (82) | OC. 72 transistor. |
| (83) | 32 v. D.C. source, namely a battery. |
| (84) | 330 ohms resistor. |

Differing light radiations whose wave lengths are included in the range of 3,000 to 12,000 Angstroms may be generated by generator 10 (FIG. 1) for remote controlledly sensing the light sensitive and responsive assembly, such radiations being preferably selected keeping in mind that such latter assembly must be made so as not to be sensitive to ambient illumination, at least as existing when a television receiver is operated.

By providing one or more generators such as at 10 previously set and secured at a given position, wherein the beam such as at 13 emitted therefrom, upon the viewer's command, is aimed to the photo-sensing element or elements, invisible light such as infra-red light may be used. Preferably a beam including in part light radiation which can be perceived by human eye is provided by generator.

Therefore, such visible beam may be readily aimed by the viewer, by handling the generator, such as a flashlight for example, for impingement thereof on the photo-sensing element, in particular to the outer opening or component, such as the outer lens 54 of FIG. 3, of the photo-sensing assembly or component, whose axial direction may be previously adjusted, by making use of an arrangement such as shown in FIG. 4 for example, for remote control from a desired location.

In addition, by making use of a properly confined or concentrated beam such as at 13 in FIG. 1, as provided by a generator including a source of light radiation, a parabolic reflector and/or concentrating lens means (such components, as being well within the knowledge of those skilled in the art, are not hereby described in detail or shown), such beam may be selectively directed upon the viewer's command on any of a plurality of spaced locations, defining intervals therebetween which are substantially larger than the effective diameter of the said concentrated beam, at the desired remote control distance, for selective activation of a corresponding plurality of beam sensing and responsive devices for selective control of differing action on a television apparatus.

Figure 8:
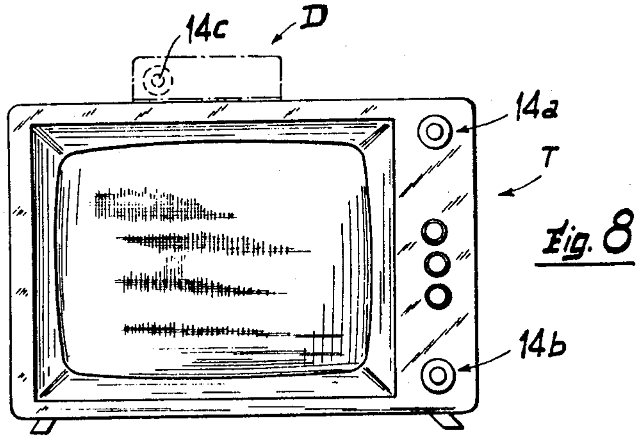
FIGURE 8 is a front elevation of a conventional television receiver provided with a plurality of selectively remote operatable devices of the invention for performing differing actions influencing the service of such receiver.

FIG. 8 illustrates in a somewhat simplified manner advantages and aspects of this latter arrangement. In proper spaced locations such as indicated at **14*a* and 14*b*** on the front panel of a television apparatus, such as generally indicated at T, or in other locations adjacent to or even spaced from the apparatus, a plurality of light radiation sensing elements are arranged, each element being connected to a device, such as shown in FIG. 2 for example, which in turn is connected to the circuitry of the apparatus for providing differing controlled actions. For example two devices are provided and arranged for switching same from VHF to UHF operation, and vice versa, for example, and respectively for switching the audio from a higher sound volume to a lower sound volume, for example, and vice versa.

In same FIG. 8 is further shown, in dot-and-dash lines, a possible combination of such arrangement with another device generally indicated at D, which might be constructed and connected such as described with reference to FIG. 5, for remotely controlling switching off and on the television apparatus, such device D being obviously located so that its own photo-sensing element at **14*c* will be spaced from other photo-sensing elements such as at 14*a* and 14*b***, for selective aiming of the command beam on one of any element, by the viewer, for causing the desired response in the operation, upon remote control according to this invention.

It is further believed to be evident that the present invention provides a plurality of advantageous features, and it will be understood that each of the new features described and shown and any combination thereof may also find useful application in other equipments differing from the ones described.

Without further consideration, the foregoing will so fully reveal the gist of this invention that others can, by applying current knowledge, readily adapt it for other applications without omitting features that, from the standpoint of prior art, fairly constitute essential characteristics of this invention and, therefore, such adaptations should and are intended to be comprehended within the spirit and meaning of this invention as above set forth and defined in and by the appended claims.

Having thus described the invention, what is claimed as new and desired to have protected by Letters Patent of the United States of America is:

A device for remotely controlling the operation of a television receiver upon a viewer's command comprising, in combination, a television receiver including means for controlling operation thereof; a viewer commanded generator adapted to emit light radiations having wave lengths in the range of 3,000–12,000 Angstroms in a beam of radiations; a photoelectric sensitive element adapted to cause an electrical variation in a circuit connected thereto upon sensing of radiations having a wave length greater than the wave length of yellow light; a casing impervious to light enclosing said sensitive element and having a radiation input opening against which said beam of radiations is adapted to be directed by the viewer; color screen means in the path of said beam of radiations and located adjacent said element, said color screen means being constructed to let radiations of said greater wave lengths pass therethrough and to be substantially impervious to radiations of shorter wave lengths; light converging optical means for converging the beam of radiations reaching said radiation input opening onto said photoelectric sensitive element; a support member rotatably supported in a stationary structure and supporting said casing so as to be adapted during rotation thereof to align said input opening of said casing and said sensitive element therein with said beam of light radiations; an actuator circuit including relay means connected to said sensitive element and adapted to be actuated in response to said electrical variations produced by said sensitive element; and an electrical connection between said relay means of said actuator circuit and said means for controlling operation of said television receiver.

References Cited by the Examiner

UNITED STATES PATENTS

| | | | |
|---|---|---|---|
| 2,760,134 | 8/1956 | Johnson | 318—266 |
| 2,807,752 | 9/1957 | McIlvaine | 250—226 X |
| 2,918,585 | 12/1959 | Farmer | 250—239 |
| 3,161,777 | 12/1964 | Farmer | 250—239 |

OTHER REFERENCES

Buchsbaum: "Remote Control for TV," Radio & Television News, pp. 46–48, November 1955.

Maxwell: "Remote Controls for TV," Radio-Electronics, pp. 34–36, September 1956.

Markus: "Flashlight Operates Photoelectric Remote Control for TV," p. 241, Handbook of Electronic Control Circuits, McGraw-Hill, 1959.

Caringella: "Build an Infrared Burglar Alarm," Popular Electronics, pp. 46–49, February 1961.

Patrick: "Light Control for Battery Powered Toys," Popular Electronics, pp. 65–66, September 1961.

DAVID G. REDINBAUGH, *Primary Examiner.*

R. L. RICHARDSON, *Assistant Examiner.*